United States Patent
G

(10) Patent No.: US 12,380,095 B2
(45) Date of Patent: Aug. 5, 2025

(54) FRAMEWORK FOR QUERY PARAMETERIZATION

(71) Applicant: SAP SE, Walldorf (DE)

(72) Inventor: Sathya G, Ernakulam (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/483,983

(22) Filed: Oct. 10, 2023

(65) Prior Publication Data
US 2025/0117378 A1   Apr. 10, 2025

(51) Int. Cl.
G06F 16/24 (2019.01)
G06F 16/242 (2019.01)
G06F 16/2455 (2019.01)

(52) U.S. Cl.
CPC ...... *G06F 16/242* (2019.01); *G06F 16/24553* (2019.01)

(58) Field of Classification Search
CPC ............ G06F 16/242; G06F 16/24553; G06F 16/24534
See application file for complete search history.

(56) References Cited

U.S. PATENT DOCUMENTS

| | | | | |
|---|---|---|---|---|
| 6,711,563 B1* | 3/2004 | Koskas | ........... | G06F 16/284 707/769 |
| 10,642,832 B1* | 5/2020 | Neumann | ........... | G06F 40/166 |
| 11,386,155 B2* | 7/2022 | Nowakiewicz | ....... | G06F 16/252 |
| 12,072,887 B1* | 8/2024 | Schieferstein | .... | G06F 16/24553 |
| 2012/0131033 A1* | 5/2012 | Bierner | ............... | G06F 16/3322 707/E17.014 |
| 2014/0280193 A1* | 9/2014 | Cronin | ............... | G06F 16/2455 707/741 |
| 2016/0055206 A1* | 2/2016 | Becerra | ............... | G06F 9/3887 707/713 |
| 2018/0260437 A1* | 9/2018 | Paroski | ............... | G06F 8/447 |
| 2019/0129988 A1* | 5/2019 | Auer | ............... | G06F 16/2343 |
| 2020/0042594 A1* | 2/2020 | Korda | ............... | G06F 16/33 |
| 2020/0272985 A1* | 8/2020 | Karakostas | ....... | G06Q 10/0832 |
| 2023/0115504 A1* | 4/2023 | Klish | ............... | G06F 16/24537 707/691 |

\* cited by examiner

*Primary Examiner* — Merilyn P Nguyen
(74) *Attorney, Agent, or Firm* — Klarquist Sparkman, LLP

(57) ABSTRACT

A computer implemented method can receive a condition expression for a query, parse the condition expression to identify parameter names and corresponding values, and evaluate validity of the parameter names and corresponding values. Responsive to finding that the parameters names and corresponding values are valid, the method can create a tree structure representing a logical relationship between the parameter names and corresponding values in a memory space, create a parameterized query comprising a modified condition expression which includes the parameter names and placeholders for the corresponding values, map the modified condition expression to a vector comprising values corresponding to the parameter names, and send the parameterized query and the vector to a query processing engine which pairs the parameter names in the modified condition expression with corresponding values contained in the vector when executing the parameterized query.

18 Claims, 10 Drawing Sheets

310 → select id, name, value where (id = 10 or id = 15) and (value = 100 or ( value >= 200 and value <= 300 )) and name = 'admin'

320 → (((id = #<?>) OR (id = #<?>)) AND (((value = #<?>) OR ((value >= #<?>) AND (value <= #<?>))) AND (name = #<?>))

330 →
10
15
100
200
300
'Admin'

```
sqlQuery q1,q2,q3,q4;
userInstance = false;

if(user== "Admin")
    construst q1;              // q1 = "(objectid=12 AND typeid=16)"
if(objname=="testdata")
    construst q2;              // q2 = "(objname=testdata AND si_cuid=AXF627QVW4BAjKZAI9mv3KY)"
if(user=="admin" && userNeedsHiddenInfo == true)
    construct q3;              // q3 = "(objectid IN (12,11) OR lastmodifytime>2015 11 01 11 12 15 005)"
if(q3 != null)
    construct q4;              // q4 = "(si_plugin_object!=0)"

finallyQuery;
if(q2 != null)
    finallyQuery = q2;
else if(q1 != null && userInstance == true)
    finallyQuery = q1;
else if(q1 != null && q3 != null)
    finallyQuery = sqlAND(q1,q3);

if(q4 != null)
    finallyQuery = sqlOr(finallyQuery, q4);

if(q1 != null && q2 != null && q3 != null && q4 != null)
{
    interimQuery = sqlOr(q1,q2);
    finallyQuery = sqlAND(sqlOr(interimQuery, sqlAND(q3,q4)));
}
```

FRAMEWORK FOR QUERY PARAMETERIZATION

BACKGROUND

Query parameterization is a structured query language (SQL) technique that uses placeholders instead of direct values, enhancing data security and query efficiency. Query parameterization can safeguard against SQL injection attacks, a major web vulnerability, by allowing the SQL engine to parse the query before receiving actual values. Query parameterization can also promote execution plan reuse for complex queries, optimizing performance and resource utilization. Despite the benefits of query parameterization, in practice, non-parameterized queries are common, especially in many legacy database applications. Thus, room for improvements exists for parameterizing SQL queries.

BRIEF DESCRIPTION OF THE DRAWINGS

FIG. 3 depicts an example use case for parameterizing a literal query.

FIG. 5 depicts a portion of an example database application configured to dynamically generate a query in which the condition clause depends on user input.

DETAILED DESCRIPTION

Overview of Query Parameterization

Figure 1:
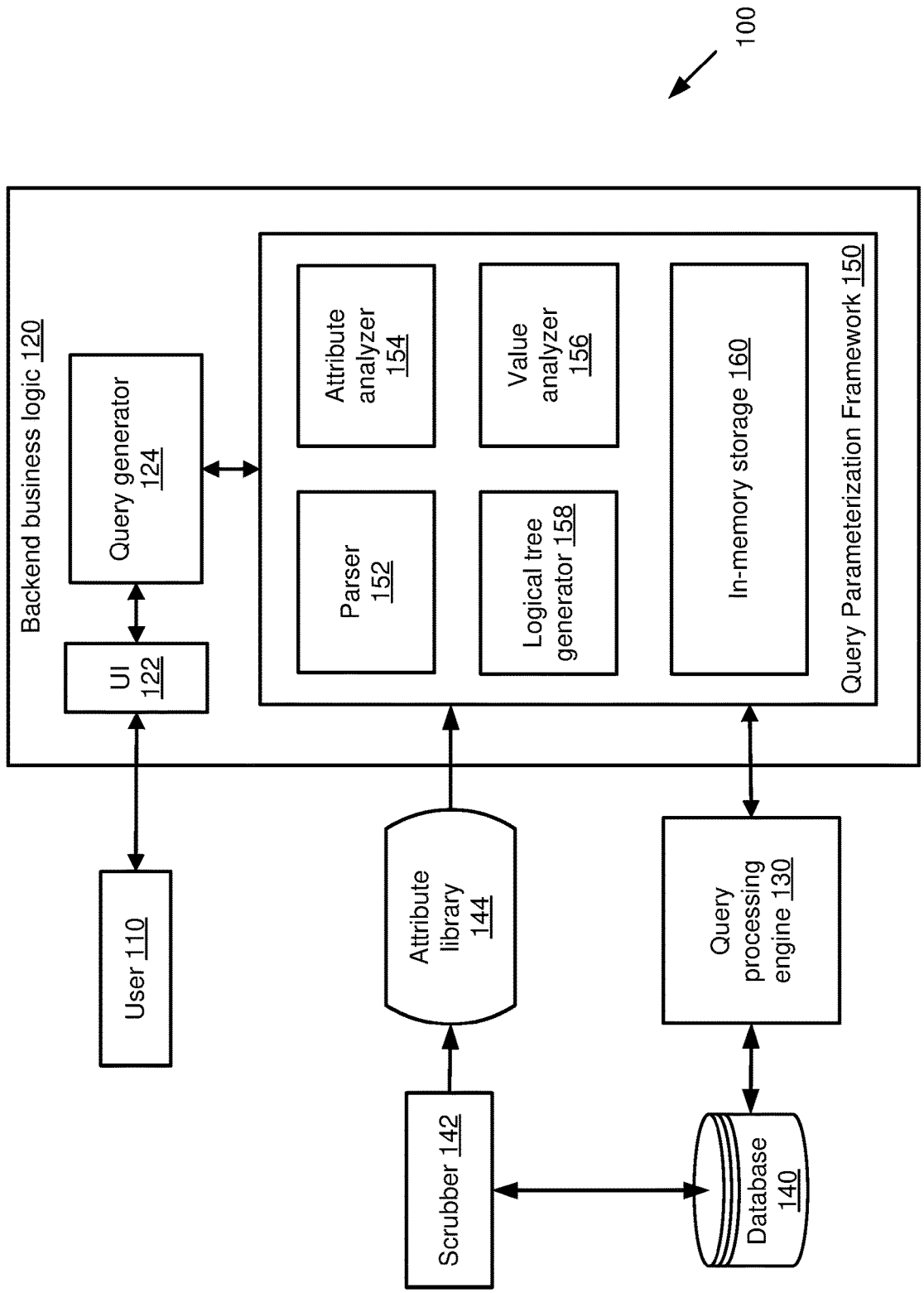
FIG. 1 is an overall block diagram of an example computing system including a query parameterization framework.

Query parameterization is a technique used in SQL programming that involves the use of placeholders instead of directly writing the values into the queries. Query parameterization is useful in situations where the exact values to be used in the query are not known at the time of writing the query but will be available at runtime. The placeholders are then replaced with actual values when the query is executed by a SQL processing engine.

One advantage of query parameterization is that it can enhance data security. Query parameterization can provide a robust defense mechanism against SQL injection attacks, which are considered one of the most dangerous web vulnerabilities. SQL injection attacks occur when an attacker is able to manipulate a SQL query by injecting malicious code, potentially leading to unauthorized access to or manipulation of data. By using parameterized queries, the SQL processing engine can fully parse and understand the structure of the query before it receives the actual values. This ensures that even if an attacker attempts to inject malicious code, it will not alter the structure or intent of the query, thereby preventing SQL injection.

In addition to enhancing data security, query parameterization can also improve query efficiency compared to non-parameterized queries, also known as literal queries. Literal queries require the SQL processing engine to create a new execution plan each time the query is run, even if the only difference between the queries is the values being used. This can lead to a high overhead, particularly for complex queries that are run multiple times. On the other hand, when a parameterized query is used, the SQL processing engine can create and maintain just one execution plan in its plan cache and reuse it for different values supplied to this statement. The SQL processing engine can recognize that the structure of the query remains the same and only the values change, thus can reuse the execution plan, reducing the overhead associated with creating and storing multiple execution plans for essentially the same query. This difference in handling makes parameterized queries much more efficient than literal queries, especially when dealing with complex queries or large databases.

Despite the improved data security and query efficiency, parameterized queries are not always used by developers, particularly in legacy applications. There are several reasons for the under-utilization of parameterized queries. For example, there can be a lack of awareness about the benefits of parameterized queries and the risks associated with SQL injection attacks. Additionally, rewriting existing queries in legacy applications to use parameterization can be a time-consuming and complex process, which may not be feasible given resource constraints or higher priority tasks. Further, some developers may find parameterized queries more difficult to read and write compared to literal queries, particularly if they are not familiar with the syntax.

The query parameterization framework described hereinafter can be used to automatically convert non-parameterized queries to parameterized queries without affecting the execution logic of the queries. As described more fully below, the query parameterization framework can be integrated into an analytical solution for SQL query generation. Such query parameterization framework can be packaged as a separate library which is database-agnostic for SQL query generation. As a result, adoption and usability of parameterized queries can be increased, thereby leading to improved efficiency and security of database interactions in analytical solutions.

Example Computing System with Query Parameterization Framework

FIG. 1 shows an overall block diagram of an example database computing system 100 including a query parameterization framework 150.

As shown in FIG. 1, through a user interface 122, a client or user 110 can interact with a backend business logic 120 to perform database operations. The backend business logic 120 is a database application implementing a set of rules and procedures that manage how data is created, read, updated, and deleted in a database 140. The backend business logic 120 can be implemented through SQL stored procedures, which are precompiled collections of SQL statements that perform a particular task. These procedures can encapsulate business rules, ensuring data integrity and consistency across the application.

In some examples, the backend business logic 120 can include a query generator 124 configured to convert user-entered information into a query. For example, information entered by a user 110 through a form can be collected as input fields on the user interface 122. When the client submits the form, the input data can be sent to the query generator 124, which processes this data to construct a structured SQL query that matches the client's input criteria. The constructed query is designed to retrieve, update, or manipulate data in the database 140 based on the client's input. Parameters from form fields, such as text boxes or dropdowns, can be incorporated into the query to filter, sort, or retrieve specific database records. Such dynamic query generation allows the database application to respond to client requests, enabling tailored data retrieval or modification based on client-provided information. In some examples, a user 110 can send a completed SQL query directly to the backend business logic 120 without the need to fill out a form and constructing the query by the query generator 124. This can happen, for example, when the client (e.g., a database application developer) is familiar with SQL programming.

The backend business logic 120 can include a query parameterization framework 150, which receives an incoming query generated by the query generator 124 or provided by the user 110. As described further below, the query parameterization framework 150 is configured to parameterize the incoming query without compromising the order of query execution structure. As shown in FIG. 1, the query parameterization framework 150 can include a parser 152, an attribute analyzer 154, a value analyzer 156, a logical tree generator 158, and an in-memory storage or memory space 160. Detailed implementation/functionality of each component in the query parameterization framework 150 is described more fully below.

Each incoming literal query will be converted to a corresponding parameterized query by the query parameterization framework 150, which is sent to a query processing engine 130 for query optimization and query execution. The query optimization involves analysis and rearrangement of compiled query plans to minimize resource usage and execution time while still producing the desired results. Query optimization can include tasks like selecting appropriate indexes, reordering joins, and utilizing caching mechanisms to enhance database query performance. The selected query plan (after query optimization) is then executed on the database 140, and the results of the query can be returned to the user 110, e.g., via the user interface 122.

As shown in FIG. 1, the computing system 100 can include a scrubber 142 configured to retrieve metadata from the database 140. Data retrieval by the scrubber 142 can be performed periodically, or on demand, or triggered when there is a change in data structure in the database 140. Metadata retrieved from the database 140 includes attribute names (e.g., column names) defined in database tables, data types defined for those attribute names (e.g., integer, string, Boolean, etc.), and data sizes defined for those attribute names. The retrieved attribute names, as well as data types and data sizes defined for those attribute names can be saved in an attribute library 144, which can be used by the query parameterization framework 150 for query validation purposes, as described further below.

In the depicted example, both the scrubber 142 and the attribute library 144 are external to the query parameterization framework 150. In other example, one or both of the scrubber 142 and the attribute library 144 can be part of the query parameterization framework 150.

In practice, the systems shown herein, such as system 100, can vary in complexity, with additional functionality, more complex components, and the like. For example, there can be additional functionality within the backend business logic 120. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the queries, attributes, values, tree structures, and the like can be stored in one or more computer-readable storage media or computer-readable storage devices. The technologies described herein can be generic to the specifics of operating systems or hardware and can be applied in any variety of environments to take advantage of the described features.

Example Query Parameterization Framework

Still referring to FIG. 1, the query parameterization framework 150 can be implemented as a software library that is independent of specific database providers. For example, for different databases, the query parameterization framework 150 can provide corresponding application programming interfaces (APIs) implementing query parameterization tasks described below. Thus, the query parameterization framework 150 can support parameterized query formation for any database engine, enhancing its versatility and adaptability.

To parameterize an incoming query, the query parameterization framework 150 first parse the query to identify parameter names and values (or literals) corresponding to the parameter names included in a condition clause (e.g., the WHERE clause in SELECT command) of the query. In some examples, the condition clause can be constructed as a logical combination of multiple condition expressions, as described further below. Parsing of the query can be performed by the parser 152.

Next, the query parameterization framework 150 can perform multiple layers of validation to ensure the authenticity of the query. A first layer of validation is performed by the attribute analyzer 154, which checks the authenticity of the parameter names based on attribute names stored in the attribute library 144. If at least one parameter name does not have a matching attribute name stored in the attribute library 144, the query will be rejected by the query parameterization framework 150. This can eliminate one common source of SQL injection where malicious SQL code inserted into input fields or query strings may modify one or more parameter names. For example, assume the received query is "select * from TABLE where userID='abc'". Here, if the parameter name "userID" does not match any of the attribute names stored in the attribute library, then the query will be rejected and an error message will be returned to the user.

If all parameter names specified in the query have matching attribute names in the attribute library 144, then a second layer of validation can be performed by the value analyzer 156, which checks whether the values (literals) specified in the query have correct data types based on attribute data types stored in the attribute library 144. If at least one value corresponding to a parameter name does not have a matching data type defined for the corresponding attribute name, the query will be rejected by the query parameterization framework 150. This can eliminate another source of SQL injection where malicious SQL code inserted into input fields or query strings may change data types or one or more parameter values. For example, assume the received query is "select * from TABLE userId=1". If the parameter name "userID" does have a matching attribute name in the attribute library but the specified attribute data type is string, then the query will be rejected because the parameter value in the query has an incorrect data type (integer 1) in this example. Without such validation (to ensure the parameter value is a string), executing the query on the database could cause an exception or pose security risk (e.g., the query can return all user details because the Boolean expression of userID=1 is always true).

If all values corresponding to the parameter names have matched data types defined for the corresponding attribute names, then the value analyzer 156 can perform a third layer of validation to ensure that the values (literals) specified in the query have correct data sizes based on attribute data sizes stored in the attribute library 144. If at least one data size of a value corresponding to a parameter name is not compatible to a data size defined for the corresponding attribute name, the query will be rejected by the query parameterization framework 150. This can eliminate an additional source of SQL injection where malicious SQL code inserted into input fields or query strings may change data sizes or one or more parameter values. For example, assume the received query is "select * from TABLE userId='an_input_from_a_doc'". Here, even if the parameter name "userID" does have a matching attribute name in the attribute library and the specified attribute data type is string, the query will still be rejected if the corresponding attribute name has a defined data size (e.g., 16) that is smaller than the data size of the parameter value (e.g., "an_input_from_a_doc" has a string size 19). Without such validation (to ensure the parameter value is a proper data size), executing the query on the database could cause a buffer-overflow exception.

After passing all three layers of validation, a tree structure representing a logical relationship between the parameter names and the corresponding values can be created, e.g., by the logical tree generator 158. The created tree structure can be stored in the memory space 160 for fast retrieval. Example tree structures and the method for creating the same are described further below.

In some examples, the condition clause of the query can be selectively constructed from multiple condition expressions. For example, a WHERE clause in a SQL query can be conditionally constructed from multiple condition expressions based on input of the user 110 entered in a form by dynamically generating the conditions using programming logic implemented in the query generator 124. Specifically, the query generator 124 can collect user input from the form, and then apply conditional logic to decide which conditions should be included in the WHERE clause based on the user's input. Then, these conditions can be concatenated to synthesize the WHERE clause, enabling the query to adapt to varying user input and create customized database queries.

When multiple condition expressions are combined to construct the condition clause of the query, each condition expression can be validated through the multi-layer validation process performed by the attribute analyzer 154 and value analyzer 156 and described above. Similarly, each condition expression can be converted to a corresponding tree structure (e.g., by the logical tree generator 158) and saved in the memory space 160. Depending on the user input, selected condition expressions are logically combined to synthesize the condition clause. Accordingly, tree structures corresponding to the selected condition expressions can be merged to generate a combined tree structure, which represents the logical relationship between parameter names and values in the synthesized condition clause. Because the tree structures are stored in the memory space 160, they can be efficiently retrieved and combined. Examples of merging multiple tree structures for selective combination of condition expressions are described further below.

Finally, the query parameterization framework 150 can create a parameterized query, which includes a modified condition clause. The modified condition clause includes the parameter names and placeholders for the corresponding values that are specified in the original (unparameterized) query and arranged in the logical relationship represented by the tree structure. Specifically, the tree structure corresponding to the condition clause can be parsed so that the values expressed in the tree structure are replaced with respective placeholders. Meanwhile, a vector containing the values which are replaced by placeholders can be created.

The modified condition clause can be mapped to the vector including the values corresponding to the parameter names. The order of the values in the vector is kept the same as the order of the parameter names appeared in the modified condition clause. Thus, each placeholder in the modified condition clause can be mapped to a corresponding value contained in the vector. The parameterized query, along with the vector, can then be sent to the query processing engine 130 for query execution. The query processing engine 130 can be configured to pair the parameter names in the modified condition clause with corresponding values contained in the vector when executing the parameterized query. As a result, the parameterized query does not change the logical conditions or order of query execution structure specified in the original (unparameterized) query.

When the condition clause of the query is constructed from multiple selected condition expressions, the combined tree structure (e.g., by merging multiple tree structures corresponding to the selected condition expressions) include parameter names specified in the selected condition expression, whereas parameter names specified in unselected condition expressions are excluded. Thus, when parsing the combined tree structure to replace values with placeholders and create the vector (mapped to the modified condition clause), the vector would include only values specified in the selected condition expression, whereas values specified in unselected condition expressions would be excluded. Again, the order of the values in the vector remains matches the order of the parameter names appeared in the modified condition clause.

Example Overall Method of Query Parameterization

Figure 2:
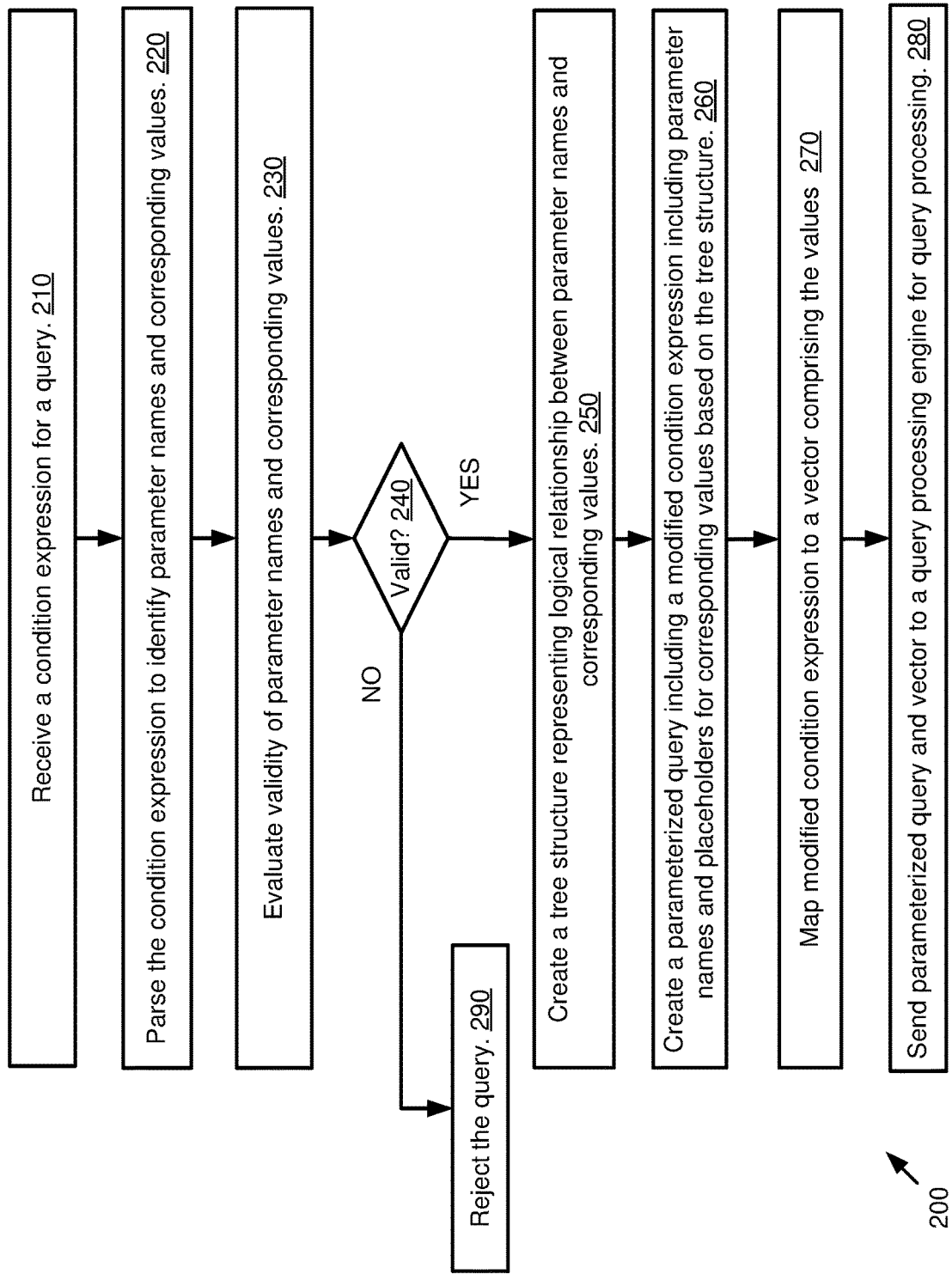
FIG. 2 is a flowchart illustrating an example overall method of parameterizing a query.

FIG. 2 is a flowchart illustrating an example overall method 200 of parameterizing a query. The method 200 can be performed, for example, by the query parameterization framework 150 of FIG. 1.

At 210, a condition expression for a query is received, e.g., by the query parameterization framework 150. In some examples, the condition expression can be one of a plurality of condition expressions, and the condition clause of the query can be synthesized as a selective logical combination of two or more of the plurality of condition expressions.

At 220, the condition expression or the condition clause is parsed, e.g., by the parser 152, to identify one or more parameter names and respective values corresponding to the one or more parameter names.

At 230, validity of the one or more parameter names and the corresponding values can be evaluated. Evaluation of the parameter names and the corresponding values can be performed, e.g., by the attribute analyzer 154 and value analyzer 156, as described above.

At 240, a condition check is performed. If any of the validation steps failed (e.g., a parameter name has no matching attribute name, a value has no matching data type or data size), then the query can be rejected at 290.

Otherwise (i.e., the one or more parameters names and the corresponding values are deemed to be valid), the method can proceed to 250, where a tree structure representing a logical relationship between the one or more parameter names and the corresponding values can be created (e.g., by the logical tree generator 158) and stored in an in-memory data storage (e.g., the memory space 160).

When the condition clause of the query is constructed from a selective combination of multiple condition expressions, tree structures corresponding to the selected condition expressions can be merged to generate a combined tree structure, as described above.

At 260, a parameterized query comprising a modified condition expression (or the modified condition clause) can be created by parsing the tree structure stored in the memory space. The modified condition expression (or the modified condition clause) comprises the one or more parameter names and placeholders for the corresponding values that are arranged in the logical relationship represented by the tree structure (or the combined tree structure).

At 270, the modified condition expression (or the condition clause) can be mapped to a vector comprising the values corresponding to the one or more parameter names. The order of the values in the vector matches the order of the parameter names appeared in the modified condition expression (or the modified condition clause).

At 280, the parameterized query and the vector can be sent to a query processing engine (e.g., the query processing engine 130) which is configured to pair the one or more parameter names in the modified condition expression (or the modified condition clause) with corresponding values contained in the vector when executing the parameterized query.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, "receive" can also be described as "send" from a different perspective.

Example Use Case of Query Parameterization

For illustration purposes, FIG. 3 depicts an example use case for parameterizing a literal query 310 using the query parameterization framework described herein.

In the depicted example, the literal query 310 includes the following condition (WHERE) clause:

(id = 10 or id = 15) and (value = 100 or ( value >= 200 and value <= 300 )) and name = 'admin'

After parsing the query 310, the following parameter names can be identified: {id, id, value, value, value, name}, and the following values corresponding the parameter names can also be identified: {10, 15, 100, 200, 300, 'admin'}. Assuming these parameter names are valid (e.g., having matching attribute names defined in the attribute library) and the values have proper data types and data sizes (e.g., both id and value have integer data types, and name has a string data type), then a tree structure 400 (see, e.g., FIG. 4) can be constructed representing the logical relationship between the parameter names and the corresponding values. By parsing the tree structure 400, a parameterized query can be generated which has the following modified condition clause 320, where the values specified in the query 310 are replaced with respective placeholders, denoted by #<?>:

((id = #<?>) OR (id = #<?>)) AND (((value = #<?>) OR ((value >= #<?>) AND (value <= #<?>)) AND (name = #<?>))

Alongside this transformation, a corresponding vector 330 containing values {10, 15, 100, 200, 300, 'admin'} is created. The order of the values in the vector 330 matches the order of the parameter names specified in the modified condition clause 320.

During the execution of this parameterized query, the query processing engine can replace each placeholder with its corresponding value from the vector 330.

Example In-Memory Tree Structure

Figure 4:
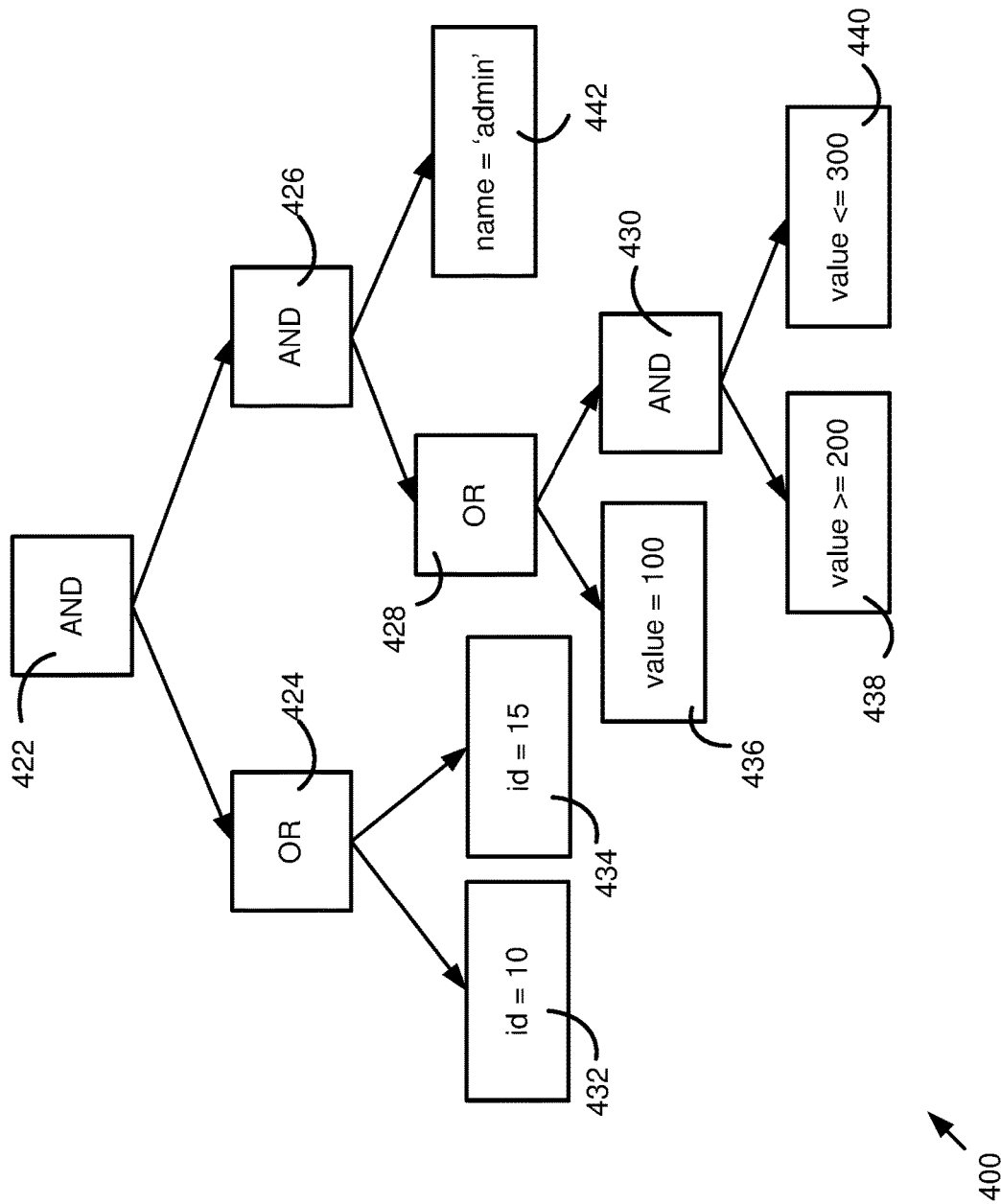
FIG. 4 depicts a tree structure constructed from a condition clause of the literal query of FIG. 3.

FIG. 4 depicts an example tree structure 400 constructed from the condition clause of the literal query 310 of FIG. 3. Constructing the tree structure 400 can be performed by the logical tree generator 158 in collaboration with the parser 152.

Generally, constructing the tree structure 400 involves breaking down the condition clause of the literal query 310 into individual components and organizing them hierarchically using logical operators. Specifically, the condition clause can be parsed to identify condition expressions or subexpressions, each involving a parameter name (e.g., id, name, etc.), a relation operator (e.g., =, >, etc.), and a value (e.g., 10, 'admin,' etc.). Related conditions can be grouped together by parentheses (e.g., conditions within parentheses can be treated as a single unit). Logical operators (e.g., AND, OR, NOT, etc.) that connect conditions can be identified. The conditions and logical operators can be organized into the tree structure 400, which starts with the highest-level logical operator, then branch out to its operands, forming subtrees for each grouping.

Generally, a tree structure can have one or more non-leaf nodes representing logical operators which are specified in the condition expression or condition clause. A non-leaf node can have two children nodes representing two logical expressions connected by the logical operator represented by the non-leaf node. At least one non-leaf node can have two leaf nodes. A leaf node represents a logical expression including a parameter name, a value corresponding to the parameter name, and a relation operator which defines a relationship between the parameter name and the corresponding value.

For example, in the example depicted in FIG. 4, the tree structure 400 includes five non-leaf nodes 422, 424, 426, 428, and 430, which respective represent the following logical operators: AND, OR, AND, OR, and AND. The tree structure 400 also includes six leaf nodes 432, 434, 436, 438, 440, and 442, which respectively represent the following logical expressions: id=10, id=15, value=100, value >=200, value <=300, and name='admin.'

In some examples, the tree structure 400 can be stored in a memory space (e.g., the memory space 160) in an equivalent descriptive format, such as:

```
sqlAnd(
    sqlOr(id = 10, id = 15),
    sqlAnd(
        sqlOr(value = 100,
        sqlAnd(value >= 200, value <= 300)
        )
        Name = 'admin'
    )
)
```

Example Dynamic Construction of Condition Clause

As described above, the condition clause of a query can be dynamically constructed from multiple condition expressions based on user input entered in a form. Such dynamic construction of condition clause allows the query to adapt to varying user input and create customized database queries.

To illustrate, FIG. 5 depicts a portion of an example database application 500 which can dynamically generate a query in which the condition clause depends on user input. As shown, a group of SQL statements 510 can selectively construct, based on user's input (e.g., fields related to username "user," object name "objname," checkbox selection of hidden information "userNeedsHiddenInfo," etc.), four condition expressions q1, q2, q3, and q4, respectively. In the depicted example, it is assumed that these four condition expressions are defined as follows:

```
q1 = "(objectid=12 AND typeid=16)"
q2 = "(objname=testdata AND si_cuid=AXF627QVW4BAjKZAI9mv3KY)"
q3 = "(objectid IN (12,11) OR lastmodifytime>2015 11 01 11 12 15 005)"
q4 = "(si_plugin_object!=0)"
```

Based on the user input (which determines if any of the condition expression q1, q2, and q3 is available), the next group of SQL statements 520 then construct a condition clause (denoted by "finalQuery") by selectively combine three of the condition expressions. For example, depends on the user input, the condition clause may include only q2, or only q1, or the logical AND of q1 and q3 (sqlAND(q1, q3)).

The next SQL statement 530 can update the condition clause, e.g., if q4 is available, to the logical OR of the previously determined condition clause and q4 (sqlOr(finallyQuery, q4)). Thus, depending on the user input, the updated condition clause can be expressed as sqlOr(q2, q4), or sqlOr(q1, q4), or sqlOr(sqlAND(q1, q3), q4).

Then, the next group of SQL statements 540 can further update the condition clause determined above, e.g., if q1, q2, q3, and q4 are all available. In this example, the final condition clause can be expressed as sqlAND(sqlOr(sqlOr(q1, q2), sqlAND(q3, q4))).

Thus, depending on user input, the final constructed condition clause of the query can vary (e.g., from a single condition expression to a logical combination of two, three, or all four condition expressions).

Example Selective Merging of Tree Structures

Figure 6:
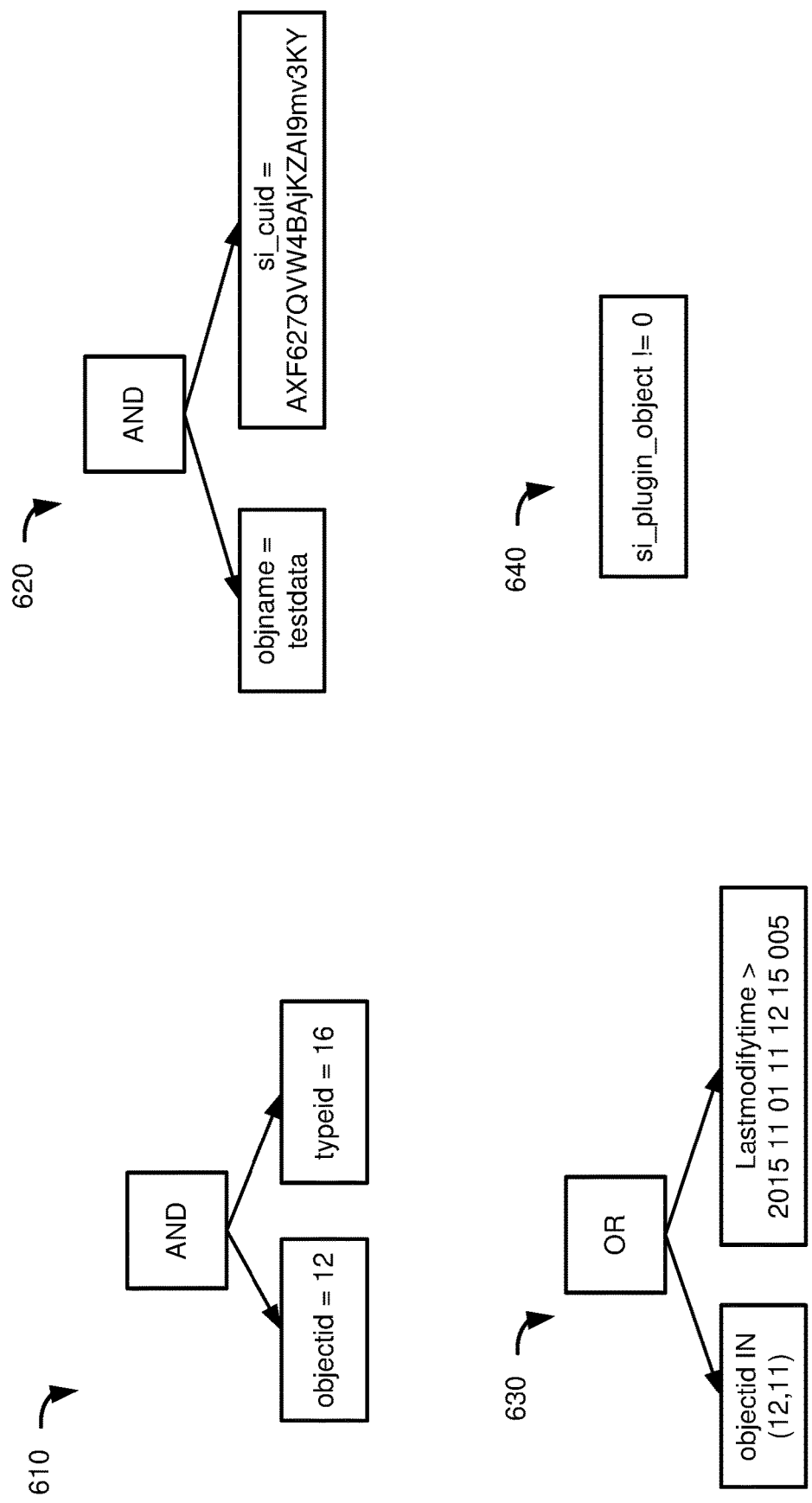
FIG. 6 depicts four example tree structures representing respective SQL expressions.

FIG. 6 depicts four example tree structures 610, 620, 630, and 640 which respectively represent condition expression q1, q2, q3, and q4 constructed by the group of SQL statements 510 depicted in FIG. 5. In this example, each of the tree structures 610, 620, and 630 includes one non-leaf node and two leaf nodes, whereas the tree structure 640 includes only a single leaf node.

As described above, for condition expressions that are selectively combined to form the condition clause, their corresponding tree structures can be merged to form a combined tree structure, which represents the logical relationship between parameter names and values in the combined condition clause. Specifically, when two condition expressions are combined by a logical operator, a new root node is created representing the logical operator, and the two tree structures corresponding to the two condition expressions respectively form two subtrees of the new root node.

Figure 7:
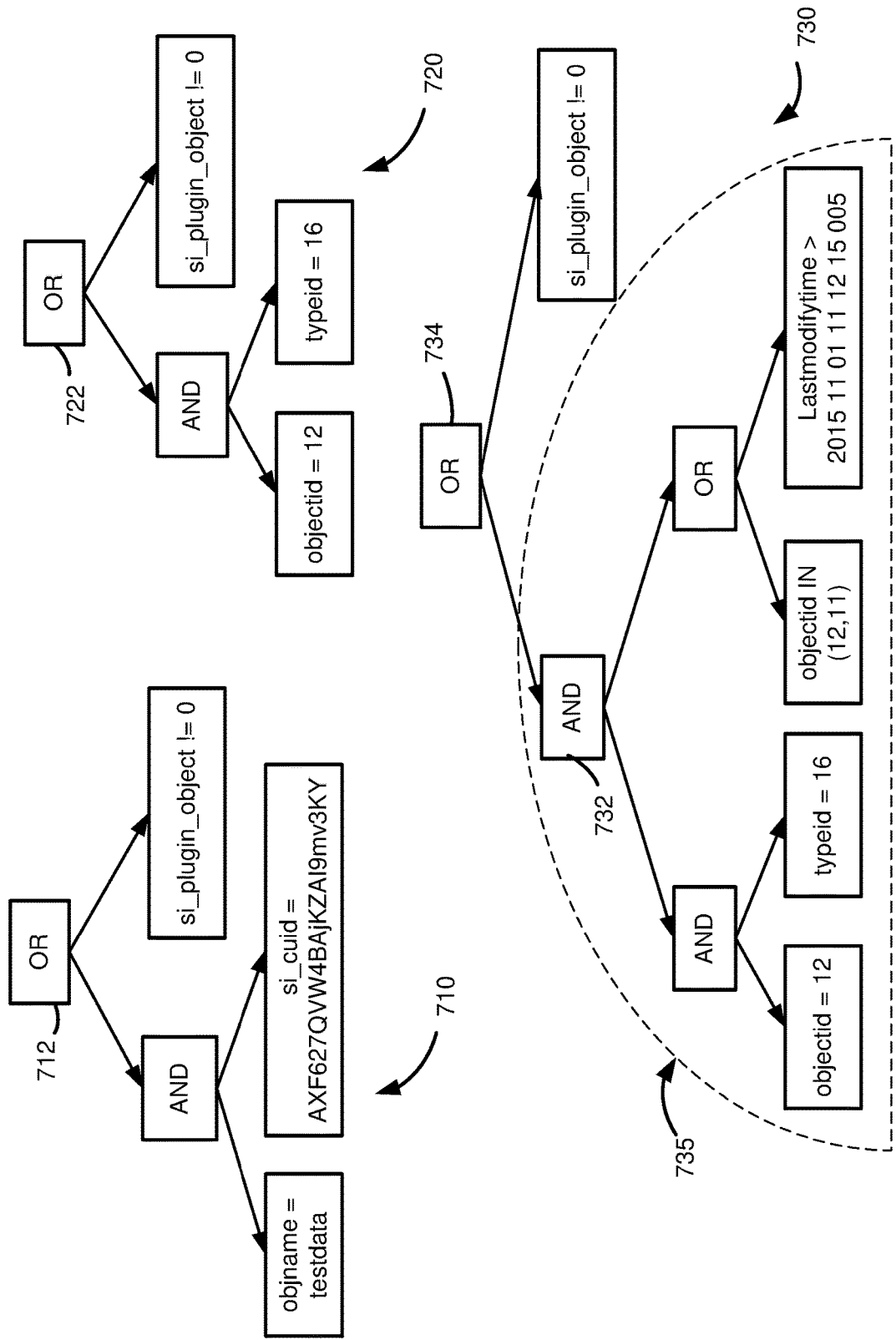
FIG. 7 depicts three example tree structures constructed by selectively merging some of the tree structures depicted in FIG. 6.

For example, FIG. 7 depicts three tree structures 710, 720, and 730, which correspond to three different condition clauses that can be constructed by the SQL statements 530 depicted in FIG. 5. For example, the tree structure 710 (corresponding to the condition clause sqlOr(q2, q4)) is created by merging tree structures 620 and 640 with a new root node 712 representing logical OR. The tree structure 720 (corresponding to the condition clause sqlOr(q1, q4)) is created by merging tree structures 610 and 640 with a new root node 722 representing logical OR. The tree structure 730 (corresponding to the condition clause sqlOr(sqlAND(q1, q3), q4)) is created by two sequential merging operations: First, tree structures 610 and 630 are merged together to form an intermediate tree structure 735 with a new root node 732 representing logical AND. Then, the intermediate tree structure 735 is merged with the tree structure 640 to form the tree structure 730 with a new root node 734 representing logical OR.

Figure 8:
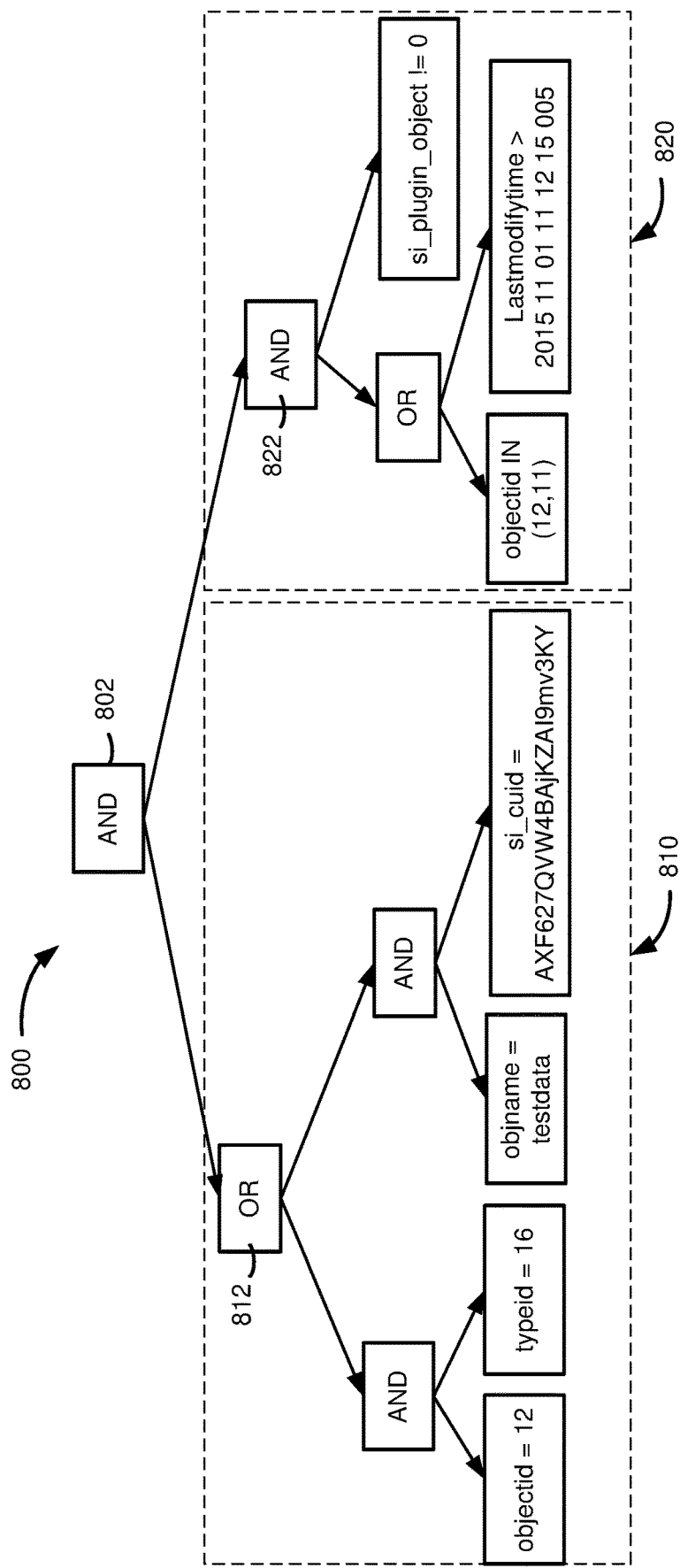
FIG. 8 depicts another example tree structure constructed by merging all four tree structures depicted in FIG. 6.

As another example, FIG. 8 shows another tree structure 800, which correspond to the condition clause constructed by the SQL statement 540 depicted in FIG. 5. The tree structure 800 is created by merging all four tree structures depicted in FIG. 6. Specifically, tree structures 610 and 620 are merged together to form an intermediate tree structure 810 with a new root node 812 representing logical OR. Then, tree structures 630 and 640 are merged together to form another intermediate tree structure 820 with a new root node 822 representing logical AND. Finally, the two intermediate tree structures 810 and 820 are merged together to form the tree structure 800 with a new root node 802 representing logical AND.

For each of the combined tree structure (e.g., 710, 720, 730, 800), a parameterized query having a modified condition clause (including selected parameter names and corresponding placeholders) and the corresponding vector can be created, as described above. For example, for tree structures 710, 720, 730, 800, the modified condition clauses of parameterized queries can be respectively expressed as follows:

```
((objname=?) AND (si_cuid=?)) OR (si_plugin_object!=?)
((objectid=?) AND (typeid=?)) OR (si_plugin_object!=?)
(((objectid=?) AND (typeid=?)) AND ((objectid IN (?, ?)) OR
(Lastmodifytime>?))) OR (si_plugin_object!=?)
(((objectid=?) AND (typeid=?)) OR ((objname=?) AND (si_cuid=?)))
AND (((objectid IN (?, ?)) OR (lastmodifytime>?)) AND
(si_plugin_object!=?))
```

The corresponding four vectors can be respectively expressed as:
{'testdata', 'AXF627QVW4BAjKZAI9mv3KY', 0}
{12, 16, 0}
{12, 16, (12, 11), '2015 11 01 11 12 15 005', 0}
{12, 16, 'testdata', 'AXF627QVW4BAjKZAI9mv3KY', (12, 11), '2015 11 01 11 12 15 005', 0}

Because the final constructed condition clause of the query can vary depending on user input, the parameter names appeared in the final parameterized query and the values appeared in the corresponding vector can also vary depending on user input. Nevertheless, for each parameterized query, its modified condition clause includes parameter names appeared in the corresponding tree structure, while the order of the values in the vector matches the order of the parameter names appeared in the modified condition clause. Thus, the parameterized query does not change the logical conditions or order of query execution structure specified in the original (unparameterized) query.

Example Advantages

A number of advantages can be achieved via the technologies described herein.

As described above, query parameterization can improve data security and query efficiency, but usage of parameterized queries is not consistent, particularly in legacy applications. The query parameterization framework described herein can automatically convert non-parameterized queries to parameterized queries without affecting the execution logic of the queries. This framework can be packaged as a separate library, making it independent of specific database vendors. As a result, the framework can support query formation for any database engine, enhancing its versatility and adaptability.

The query parameterization framework described herein utilizes multi-layer validation to ensure that only valid parameter names and valid values (proper data type and data size) are sent to query processing engine. After validation, in-memory tree structures are constructed to represent condition expressions of the queries. By merging selected tree structures stored in the memory space, the disclosed framework also supports dynamic construction of condition clause based on user input create customized database queries.

From an end-user perspective, the query parameterization framework described herein ensures every query generated by the user can be automatically parameterized, thereby improving query efficiency. From a developer perspective, the framework makes it easier to maintain the query part of code base and eliminates worries about parameterizing queries for different database vendors. Additionally, the query parameterization framework described herein can contribute to product security by reducing the chances of SQL injection.

Example Computing Systems

Figure 9:
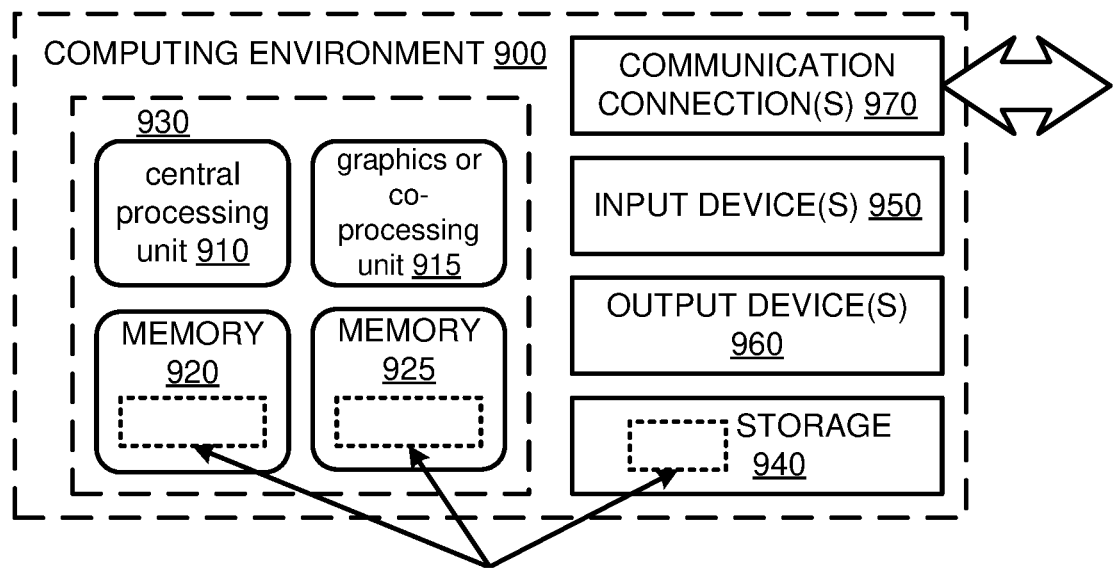
FIG. 9 is a block diagram of an example computing system in which described embodiments can be implemented.

FIG. 9 depicts an example of a suitable computing system 900 in which the described innovations can be implemented. The computing system 900 is not intended to suggest any limitation as to scope of use or functionality of the present disclosure, as the innovations can be implemented in diverse computing systems.

With reference to FIG. 9, the computing system 900 includes one or more processing units 910, 915 and memory 920, 925. In FIG. 9, this basic configuration 930 is included within a dashed line. The processing units 910, 915 can execute computer-executable instructions, such as for implementing the features described in the examples herein (e.g., the method 200, etc.). A processing unit can be a general-purpose central processing unit (CPU), processor in an application-specific integrated circuit (ASIC), or any other type of processor. In a multi-processing system, multiple processing units can execute computer-executable instructions to increase processing power. For example, FIG. 9 shows a central processing unit 910 as well as a graphics processing unit or co-processing unit 915. The tangible memory 920, 925 can be volatile memory (e.g., registers, cache, RAM), non-volatile memory (e.g., ROM, EEPROM, flash memory, etc.), or some combination of the two, accessible by the processing unit(s) 910, 915. The memory 920, 925 can store software 980 implementing one or more innovations described herein, in the form of computer-executable instructions suitable for execution by the processing unit(s) 910, 915.

A computing system 900 can have additional features. For example, the computing system 900 can include storage 940, one or more input devices 950, one or more output devices 960, and one or more communication connections 970, including input devices, output devices, and communication connections for interacting with a user. An interconnection mechanism (not shown) such as a bus, controller, or network can interconnect the components of the computing system 900. Typically, operating system software (not shown) can provide an operating environment for other software executing in the computing system 900, and coordinate activities of the components of the computing system 900.

The tangible storage 940 can be removable or non-removable, and includes magnetic disks, magnetic tapes or cassettes, CD-ROMs, DVDs, or any other medium which can be used to store information in a non-transitory way and which can be accessed within the computing system 900. The storage 940 can store instructions for the software implementing one or more innovations described herein.

The input device(s) 950 can be an input device such as a keyboard, mouse, pen, or trackball, a voice input device, a scanning device, touch device (e.g., touchpad, display, or the like) or another device that provides input to the computing system 900. The output device(s) 960 can be a display, printer, speaker, CD-writer, or another device that provides output from the computing system 900.

The communication connection(s) 970 can enable communication over a communication medium to another computing entity. The communication medium can convey information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components can include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing device to perform the method. The technologies described herein can be implemented in a variety of programming languages.

Example Cloud Computing Environment

Figure 10:
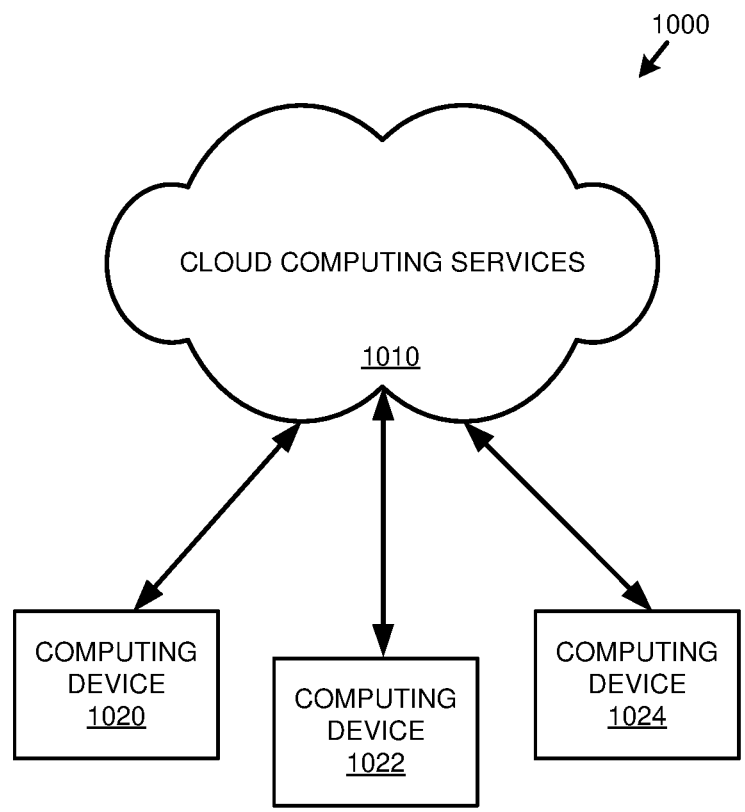
FIG. 10 is a block diagram of an example cloud computing environment that can be used in conjunction with the technologies described herein.

FIG. 10 depicts an example cloud computing environment 1000 in which the described technologies can be implemented, including, e.g., the system 100 and other systems herein. The cloud computing environment 1000 can include cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 can be utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operations (e.g., data processing, data storage, and the like).

In practice, cloud-based, on-premises-based, or hybrid scenarios can be supported.

Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

As described in this application and in the claims, the singular forms "a," "an," and "the" include the plural forms unless the context clearly dictates otherwise. Additionally, the term "includes" means "comprises." Further, "and/or" means "and" or "or," as well as "and" and "or."

Example Clauses

Any of the following example clauses can be implemented.

Clause 1. A computer-implemented method comprising: receiving a condition expression for a query; parsing the condition expression to identify one or more parameter names and respective values corresponding to the one or more parameter names; evaluating validity of the one or more parameter names and the corresponding values; responsive to finding that the one or more parameters names and the corresponding values are valid, creating a tree structure representing a logical relationship between the one or more parameter names and the corresponding values in a memory space; creating a parameterized query comprising a modified condition expression, wherein the modified condition expression comprises the one or more parameter names and placeholders for the corresponding values that are arranged in the logical relationship represented by the tree structure; mapping the modified condition expression to a vector comprising the values corresponding to the one or more parameter names; and sending the parameterized query and the vector to a query processing engine which pairs the one or more parameter names in the modified condition expression with corresponding values contained in the vector when executing the parameterized query.

Clause 2. The method of clause 1, wherein the evaluating validity comprises: verifying the one or more parameter names have matching attribute names defined in one or more database tables; and responsive to finding that at least one parameter name does not have a matching attribute name, rejecting the query.

Clause 3. The method of any one of clauses 1-2, wherein the evaluating validity further comprises: responsive to finding that the one or more parameter names have matching attribute names, verifying values corresponding to the one or more parameter names have matching data types defined for the corresponding attribute names; and responsive to finding that at least one value corresponding to a parameter name does not have a matching data type defined for the corresponding attribute name, rejecting the query.

Clause 4. The method of clause 3, wherein the evaluating validity further comprises: responsive to finding that values corresponding to the one or more parameter names have matching data types defined for the corresponding attribute names, verifying data sizes of the values corresponding to the one or more parameter names are compatible to data sizes defined for the corresponding attribute names; and responsive to finding that at least one data size of a value corresponding to a parameter name is not compatible to a data size defined for the corresponding attribute name, rejecting the query.

Clause 5. The method of any one of clauses 1-4, wherein creating the parameterized query comprises parsing the tree structure and replacing the values with respective placeholders.

Clause 6. The method of any one of clauses 1-5, wherein the condition expression is one of a plurality of condition expressions, the method further comprising: synthesizing a condition clause comprising a selective logical combination of two or more of the plurality of condition expressions; and generating a modified condition clause by replacing values in the condition clause with corresponding placeholders, wherein the parameterized query comprises the modified condition clause.

Clause 7. The method of clause 6, wherein further comprising: creating a plurality of tree structures corresponding to the plurality of condition expressions; generating a combined tree structure by selectively merging two or more of the plurality of tree structures corresponding to the two or more of the plurality of condition expressions selected for logical combination; generating a combined vector comprising values in the combined tree structure; and mapping the modified condition clause to the combined vector, wherein the query processing engine is configured to replace placeholders in the modified condition clause with corresponding values in the combined vector when executing the parameterized query.

Clause 8. The method of any one of clauses 1-7, wherein the tree structure comprises one or more non-leaf nodes representing logical operators which are specified in the condition expression, wherein a non-leaf node has two children nodes representing two logical expressions connected by the logical operator represented by the non-leaf node.

Clause 9. The method of clause 8, wherein at least one non-leaf node has two leaf nodes, wherein a leaf node represents a logical expression comprising a parameter name, a value corresponding to the parameter name, and a relation operator which defines a relationship between the parameter name and the corresponding value.

Clause 10. The method of any one of clauses 1-9, further comprising creating an attribute library comprising attribute names defined in database tables, data types and data sizes defined for the attribute names, wherein the evaluating validity is based on comparing the one or more parameter names and the corresponding values with attribute names, data types, and data sizes stored in the attribute library.

Clause 11. A computing system, comprising: memory; one or more hardware processors coupled to the memory; and one or more computer readable storage media storing instructions that, when loaded into the memory, cause the one or more hardware processors to perform operations comprising: receiving a condition expression for a query; parsing the condition expression to identify one or more parameter names and respective values corresponding to the one or more parameter names; evaluating validity of the one or more parameter names and the corresponding values; responsive to finding that the one or more parameters names and the corresponding values are valid, creating a tree structure representing a logical relationship between the one or more parameter names and the corresponding values in a memory space; creating a parameterized query comprising a modified condition expression, wherein the modified condition expression comprises the one or more parameter names and placeholders for the corresponding values that are arranged in the logical relationship represented by the tree structure; mapping the modified condition expression to a vector comprising the values corresponding to the one or more parameter names; and sending the parameterized query and the vector to a query processing engine which pairs the one or more parameter names in the modified condition expression with corresponding values contained in the vector when executing the parameterized query.

Clause 12. The system of clause 11, wherein the evaluating validity comprises: verifying the one or more parameter names have matching attribute names defined in one or more database tables; and responsive to finding that at least one parameter name does not have a matching attribute name, rejecting the query.

Clause 13. The system of clause 12, wherein the evaluating validity further comprises: responsive to finding that the one or more parameter names have matching attribute names, verifying values corresponding to the one or more parameter names have matching data types defined for the corresponding attribute names; and responsive to finding that at least one value corresponding to a parameter name does not have a matching data type defined for the corresponding attribute name, rejecting the query.

Clause 14. The system of clause 13, wherein the evaluating validity further comprises: responsive to finding that values corresponding to the one or more parameter names have matching data types defined for the corresponding attribute names, verifying data sizes of the values corresponding to the one or more parameter names are compatible to data sizes defined for the corresponding attribute names; and responsive to finding that at least one data size of a value corresponding to a parameter name is not compatible to a data size defined for the corresponding attribute name, rejecting the query.

Clause 15. The system of any one of clauses 11-14, wherein creating the parameterized query comprises parsing the tree structure and replacing the values with respective placeholders.

Clause 16. The system of any one of clauses 11-15, wherein the condition expression is one of a plurality of condition expressions, wherein the operations further comprise: synthesizing a condition clause comprising a selective logical combination of two or more of the plurality of condition expressions; and generating a modified condition clause by replacing values in the condition clause with corresponding placeholders, wherein the parameterized query comprises the modified condition clause.

Clause 17. The system of clause 16, wherein the operations further comprise: creating a plurality of tree structures corresponding to the plurality of condition expressions; generating a combined tree structure by selectively merging two or more of the plurality of tree structures corresponding to the two or more of the plurality of condition expressions selected for logical combination; generating a combined vector comprising values in the combined tree structure; and mapping the modified condition clause to the combined vector, wherein the query processing engine is configured to replace placeholders in the modified condition clause with corresponding values in the combined vector when executing the parameterized query.

Clause 18. The system of any one of clauses 11-17, wherein the tree structure comprises one or more non-leaf nodes representing logical operators which are specified in the condition expression, wherein a non-leaf node has two children nodes representing two logical expressions connected by the logical operator represented by the non-leaf node.

Clause 19. The system of clause 18, wherein at least one non-leaf node has two leaf nodes, wherein a leaf node represents a logical expression comprising a parameter name, a value corresponding to the parameter name, and a relation operator which defines a relationship between the parameter name and the corresponding value.

Clause 20. One or more non-transitory computer-readable media having encoded thereon computer-executable instructions causing one or more processors to perform a method comprising: receiving a condition expression for a query; parsing the condition expression to identify one or more parameter names and respective values corresponding to the one or more parameter names; evaluating validity of the one or more parameter names and the corresponding values; responsive to finding that the one or more parameters names and the corresponding values are valid, creating a tree structure representing a logical relationship between the one or more parameter names and the corresponding values in a memory space; creating a parameterized query comprising a modified condition expression, wherein the modified condition expression comprises the one or more parameter names and placeholders for the corresponding values that are arranged in the logical relationship represented by the tree structure; mapping the modified condition expression to a vector comprising the values corresponding to the one or more parameter names; and sending the parameterized query and the vector to a query processing engine which pairs the one or more parameter names in the modified condition expression with corresponding values contained in the vector when executing the parameterized query, wherein the evaluating validity comprises: verifying the one or more parameter names have matching attribute names defined in one or more database tables; and responsive to finding that at least one parameter name does not have a matching attribute name, rejecting the query.

EXAMPLE ALTERNATIVES

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method for automatic parameterization of non-parameterized queries in real-time using a query parameterization framework implemented as a software library that is independent of database providers, the method comprising:
    receiving, by the query parameterization framework, a condition expression for a structured query language (SQL) query;
    parsing, automatically by the query parameterization framework, the condition expression to identify one or more parameter names and respective values corresponding to the one or more parameter names;
    evaluating, automatically by the query parameterization framework, validity of the one or more parameter names and the corresponding values;
    responsive to finding that the one or more parameters names and the corresponding values are valid, creating, automatically by the query parameterization framework, a tree structure representing a logical relationship between the one or more parameter names and the corresponding values in a memory space, wherein the tree structure comprises one or more non-leaf nodes representing Boolean operators which are specified in the condition expression, wherein a non-leaf node has two children nodes representing two logical expressions connected by the Boolean operator represented by the non-leaf node;
    creating, automatically by the query parameterization framework, a parameterized query comprising a modified condition expression, wherein the modified condition expression comprises the one or more parameter names and placeholders for the corresponding values that are arranged in the logical relationship represented by the tree structure, wherein the parameterized query is identical to the SQL query except that the values corresponding to the one or more parameter names are replaced with respective placeholders;
    mapping, automatically by the query parameterization framework, the modified condition expression to a vector comprising the values corresponding to the one or more parameter names;
    sending, automatically by the query parameterization framework, the parameterized query and the vector to a query processing engine; and
    executing, automatically by the query processing engine, the parameterized query, wherein the executing comprises pairing the one or more parameter names in the modified condition expression with corresponding values contained in the vector,
    wherein the evaluating validity comprises:
        verifying the one or more parameter names have matching attribute names defined in one or more database tables;
        verifying values corresponding to the one or more parameter names have matching data types defined for the corresponding attribute names; and
        verifying data sizes of the values corresponding to the one or more parameter names are compatible to data sizes defined for the corresponding attribute names.

2. The method of claim 1, wherein
responsive to finding that at least one parameter name does not have a matching attribute name, rejecting the SQL query.

3. The method of claim 1, wherein
responsive to finding that at least one value corresponding to a parameter name does not have a matching data type defined for the corresponding attribute name, rejecting the SQL query.

4. The method of claim 1, wherein
responsive to finding that at least one data size of a value corresponding to a parameter name is not compatible to a data size defined for the corresponding attribute name, rejecting the SQL query.

5. The method of claim 1, wherein creating the parameterized query comprises parsing the tree structure and replacing the values with respective placeholders.

6. The method of claim 1, wherein the condition expression is one of a plurality of condition expressions, the method further comprising:
- synthesizing a condition clause comprising a selective logical combination of two or more of the plurality of condition expressions; and
- generating a modified condition clause by replacing values in the condition clause with corresponding placeholders,
- wherein the parameterized query comprises the modified condition clause.

7. The method of claim 6, wherein further comprising:
- creating a plurality of tree structures corresponding to the plurality of condition expressions;
- generating a combined tree structure by selectively merging two or more of the plurality of tree structures corresponding to the two or more of the plurality of condition expressions selected for logical combination;
- generating a combined vector comprising values in the combined tree structure; and
- mapping the modified condition clause to the combined vector,
- wherein the query processing engine is configured to replace placeholders in the modified condition clause with corresponding values in the combined vector when executing the parameterized query.

8. The method of claim 1, wherein at least one non-leaf node has two leaf nodes, wherein a leaf node represents a logical expression comprising a parameter name, a value corresponding to the parameter name, and a relation operator which defines a relationship between the parameter name and the corresponding value.

9. The method of claim 1, further comprising creating an attribute library comprising attribute names defined in database tables, data types and data sizes defined for the attribute names, wherein the evaluating validity is based on comparing the one or more parameter names and the corresponding values with attribute names, data types, and data sizes stored in the attribute library.

10. A computing system for automatic parameterization of non-parameterized queries in real-time using a query parameterization framework implemented as a software library that is independent of database providers, the system comprising:
- memory;
- one or more hardware processors coupled to the memory; and
- one or more computer readable storage media storing instructions that, when loaded into the memory, cause the one or more hardware processors to perform operations comprising:
  - receiving, by the query parameterization framework, a condition expression for a structured query language (SQL) query;
  - parsing, automatically by the query parameterization framework, the condition expression to identify one or more parameter names and respective values corresponding to the one or more parameter names;
  - evaluating, automatically by the query parameterization framework, validity of the one or more parameter names and the corresponding values;
  - responsive to finding that the one or more parameters names and the corresponding values are valid, creating, automatically by the query parameterization framework, a tree structure representing a logical relationship between the one or more parameter names and the corresponding values in a memory space, wherein the tree structure comprises one or more non-leaf nodes representing Boolean operators which are specified in the condition expression, wherein a non-leaf node has two children nodes representing two logical expressions connected by the Boolean operator represented by the non-leaf node;
  - creating, automatically by the query parameterization framework, a parameterized query comprising a modified condition expression, wherein the modified condition expression comprises the one or more parameter names and placeholders for the corresponding values that are arranged in the logical relationship represented by the tree structure, wherein the parameterized query is identical to the SQL query except that the values corresponding to the one or more parameter names are replaced with respective placeholders;
  - mapping, automatically by the query parameterization framework, the modified condition expression to a vector comprising the values corresponding to the one or more parameter names;
  - sending, automatically by the query parameterization framework, the parameterized query and the vector to a query processing engine; and
  - executing, automatically by the query processing engine, the parameterized query, wherein the executing comprises pairing the one or more parameter names in the modified condition expression with corresponding values contained in the vector,
  - wherein the evaluating validity comprises:
    - verifying the one or more parameter names have matching attribute names defined in one or more database tables;
    - verifying values corresponding to the one or more parameter names have matching data types defined for the corresponding attribute names; and
    - verifying data sizes of the values corresponding to the one or more parameter names are compatible to data sizes defined for the corresponding attribute names.

11. The system of claim 10, wherein
responsive to finding that at least one parameter name does not have a matching attribute name, rejecting the SQL query.

12. The system of claim 10, wherein
responsive to finding that at least one value corresponding to a parameter name does not have a matching data type defined for the corresponding attribute name, rejecting the SQL query.

13. The system of claim 10, wherein
responsive to finding that at least one data size of a value corresponding to a parameter name is not compatible to a data size defined for the corresponding attribute name, rejecting the SQL query.

14. The system of claim 10, wherein creating the parameterized query comprises parsing the tree structure and replacing the values with respective placeholders.

15. The system of claim 10, wherein the condition expression is one of a plurality of condition expressions, wherein the operations further comprise:
- synthesizing a condition clause comprising a selective logical combination of two or more of the plurality of condition expressions; and
- generating a modified condition clause by replacing values in the condition clause with corresponding placeholders,
- wherein the parameterized query comprises the modified condition clause.

16. The system of claim 15, wherein the operations further comprise:
- creating a plurality of tree structures corresponding to the plurality of condition expressions;
- generating a combined tree structure by selectively merging two or more of the plurality of tree structures corresponding to the two or more of the plurality of condition expressions selected for logical combination;
- generating a combined vector comprising values in the combined tree structure; and
- mapping the modified condition clause to the combined vector,
- wherein the query processing engine is configured to replace placeholders in the modified condition clause with corresponding values in the combined vector when executing the parameterized query.

17. The system of claim 10, wherein at least one non-leaf node has two leaf nodes, wherein a leaf node represents a logical expression comprising a parameter name, a value corresponding to the parameter name, and a relation operator which defines a relationship between the parameter name and the corresponding value.

18. One or more non-transitory computer-readable media having encoded thereon computer-executable instructions causing one or more processors to perform a method for automatic parameterization of non-parameterized queries in real-time using a query parameterization framework implemented as a software library that is independent of database providers, the method comprising:
- receiving, by the query parameterization framework, a condition expression for a structured query language (SQL) query;
- parsing, automatically by the query parameterization framework, the condition expression to identify one or more parameter names and respective values corresponding to the one or more parameter names;
- evaluating, automatically by the query parameterization framework, validity of the one or more parameter names and the corresponding values;
- responsive to finding that the one or more parameters names and the corresponding values are valid, creating, automatically by the query parameterization framework, a tree structure representing a logical relationship between the one or more parameter names and the corresponding values in a memory space, wherein the tree structure comprises one or more non-leaf nodes representing Boolean operators which are specified in the condition expression, wherein a non-leaf node has two children nodes representing two logical expressions connected by the Boolean operator represented by the non-leaf node;
- creating, automatically by the query parameterization framework, a parameterized query comprising a modified condition expression, wherein the modified condition expression comprises the one or more parameter names and placeholders for the corresponding values that are arranged in the logical relationship represented by the tree structure, wherein the parameterized query is identical to the SQL query except that the values corresponding to the one or more parameter names are replaced with respective placeholders;
- mapping, automatically by the query parameterization framework, the modified condition expression to a vector comprising the values corresponding to the one or more parameter names;
- sending, automatically by the query parameterization framework, the parameterized query and the vector to a query processing engine; and
- executing, automatically by the query processing engine, the parameterized query, wherein the executing comprises pairing the one or more parameter names in the modified condition expression with corresponding values contained in the vector,
- wherein the evaluating validity comprises:
    - verifying the one or more parameter names have matching attribute names defined in one or more database tables;
    - verifying values corresponding to the one or more parameter names have matching data types defined for the corresponding attribute names; and
    - verifying data sizes of the values corresponding to the one or more parameter names are compatible to data sizes defined for the corresponding attribute names.

* * * * *